United States Patent

[11] 3,569,983

[72] Inventor Edward W. Marshall
Saratoga, Calif.
[21] Appl. No. 731,065
[22] Filed May 22, 1968
[45] Patented Mar. 9, 1971
[73] Assignee Varian Associates
Palo Alto, Calif.

[54] WRITING CIRCUIT FOR ELECTROSTATIC RECORDERS
10 Claims, 3 Drawing Figs.

[52] U.S. Cl. 346/74
[51] Int. Cl. G01d 15/06
[50] Field of Search 346/74 (E), (ES), (S), (SB), (SC), (Broad); 178/23, 30

[56] References Cited
UNITED STATES PATENTS

| | | | |
|---|---|---|---|
| 3,131,256 | 4/1964 | Frohbach | 346/74X |
| 3,196,451 | 7/1965 | Jones et al. | 346/74 |
| 3,208,076 | 9/1965 | Mott | 346/74 |

*Primary Examiner*—Bernard Konick
*Assistant Examiner*—Gary M. Hoffman
*Attorneys*—William J. Nolan and Leon F. Herbert

ABSTRACT: There is disclosed electrostatic recording apparatus in which the potential swing of the stylii electrode is reduced to a level that a single readily available conventional low voltage rated transistor may be used as the driver for each of the recording stylii. The reduction in stylii voltage swing is made possible by the use of a pulsed bias, called enhancement pulses, on the stylii backup electrode. The pulse width of the enhancement pulses is maintained sufficiently short, as of less than 2 microseconds, to permit the amplitude of the pulse to exceed the minimum potential required for electrostatic recording (charging of the recording medium). For a stylii potential swing of 300 volts, typical parameters for the frequency, amplitude and pulse width of the enhancement pulses are 110 kHz., 600 volts and 1 microsecond, respectively. In addition to the reduction in the number of transistors and power supplies required, significant improvement in the quality of the low frequency and DC signal recordings without a comparable degration of high frequency performance is also obtained.

PATENTED MAR 9 1971 3,569,983

INVENTOR.
EDWARD W. MARSHALL

BY Wm J Nolan
ATTORNEY

WRITING CIRCUIT FOR ELECTROSTATIC RECORDERS

DESCRIPTION OF THE PRIOR ART

Electrostatic recording involves selectively charging a dielectric recording medium disposed between one or more stylii and stylii backup electrode. Thereafter, a toner is applied to make visible the areas charged. For high quality recordings of signals over a broad frequency range, as of 0 to 1.5 kHz. potentials of about 600 volts across the recording medium are typically required.

In conventional apparatus, both DC and pulsed bias potentials on the stylii backup electrode are maintained below the minimum potential required for recording. When recording, appropriate potentials are applied to the stylii to additively combine with the bias potential to develop a total of, say, 600 volts across the recording medium. These combined voltages establish additive electric fields across the normally nonconductive fluid in the electrode gap. The additive effect of the electric fields is greater than the critical electric stress of the fluid. Alternatively, a DC bias greater than the minimum potential required for recording is often used. In such cases, to counterbalance this bias for selective recording, a like potential is placed on the stylii. For recording, the stylii potential is removed as by grounding the stylii through a stylii driver. In apparatus of the latter type, the unavailability of low cost, high speed transistors able to operate under the required high DC potentials has necessitated the use of two low voltage transistors arranged in series. The need for two stylii driving transistors further necessitates the use of additional power supplies.

In addition, poor low frequency and DC signal trace quality in the form of burn-in, blurring and splattering of low frequency and DC signal records also has been observed to frequently occur in the use of prior art apparatus. It is believed that the effects are caused by excessive ionization of the airgap and recording medium. During recording each stylus is triggered by a write or record pulse and is maintained in a recording condition for a relatively long time, as of 25 microseconds. For high resolution recording of high amplitude and high frequency signals, each stylus is triggered quite rapidly, as of every 2 microseconds. Thus, when a DC or low frequency signal is being recorded, the same stylus may be kept in a recording condition continuously.

SUMMARY OF THE PRESENT INVENTION

In the description of the present invention there is disclosed an improved electrostatic recording apparatus utilizing narrow, large amplitude pulses for providing sufficient bias potential on the stylii backup electrode to permit a reduction of the stylii potential swing to a level acceptable for using single low cost, high speed transistors as stylii drivers.

Accordingly, a primary object of the present invention is improved lower cost electrostatic recording apparatus.

Another object of the present invention is a reduction in the number of required stylii driving transistors and associated power supplies.

Another object of the present invention is improved recording of low frequency and DC signals without a reduction in high frequency performance.

A primary feature of the present invention is the use of a high repetition rate pulse source for generating narrow, high amplitude pulses for providing a bias potential on the stylii backup electrode which may exceed the minimum potential required for recording thereby permitting a reduction in the potential swing of the stylii.

Other objects, features and advantages of the present invention will become apparent in the detailed description hereinafter when considered in connection with the accompanying drawing in which:

DESCRIPTION OF THE PREFERRED EMBODIMENTS

Figures 1, 2, 3:
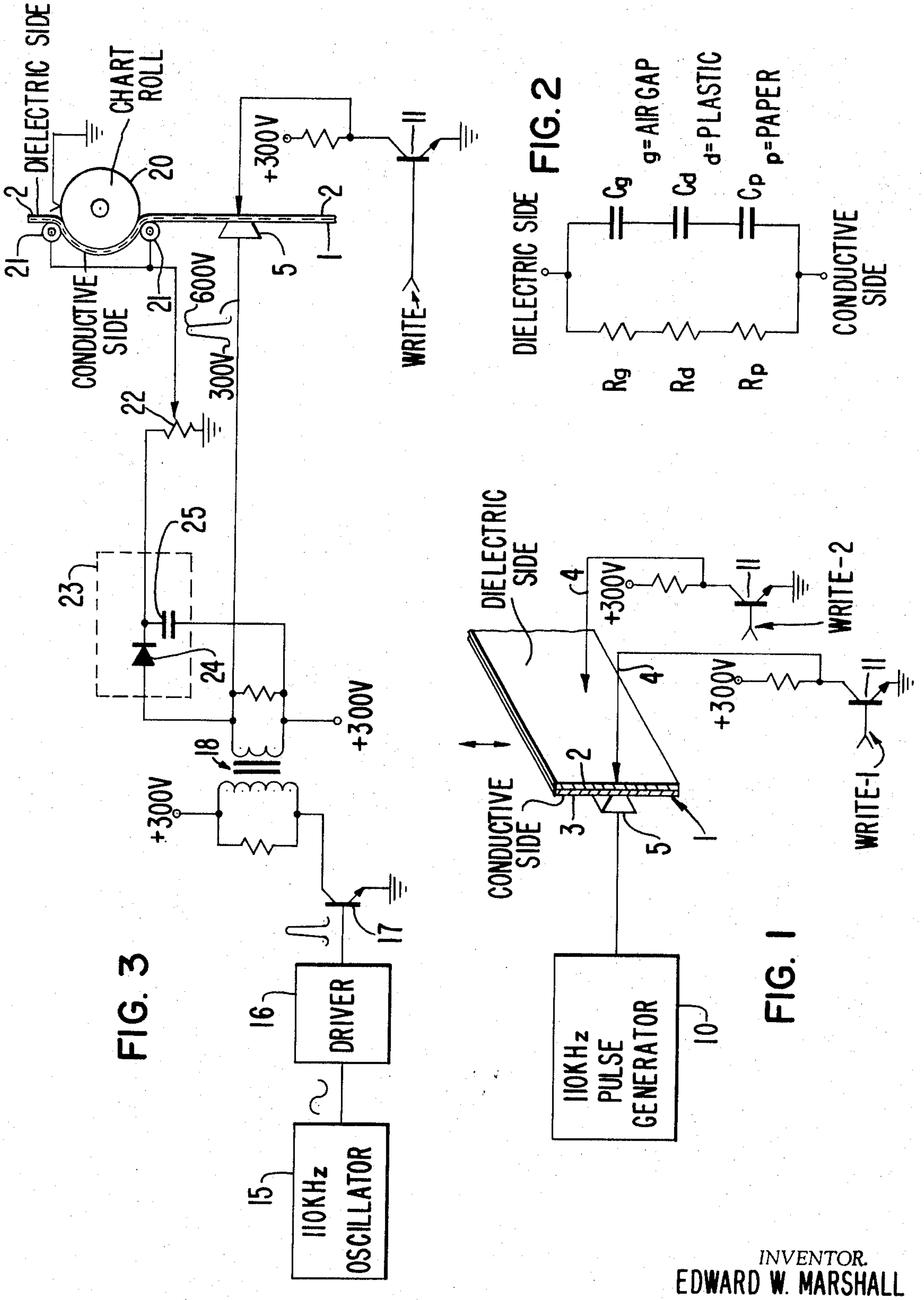
FIG. 1 is a simplified schematic of a simplified stylus recording circuit incorporating the present invention.
FIG. 2 is a schematic of the equivalent circuit of the recording medium used with the apparatus incorporating the present invention.
FIG. 3 is a simplified schematic of a chart roll embodiment incorporating the present invention.

Referring to FIG. 1 there is shown a simplified schematic of an electrostatic recording circuit embodying the present invention.

Dielectric electrostatic recording paper 1 consisting of a layer of dielectric material 2 and conductive material 3 is disposed in the airgap or charging path between one or more stylii 4 (only two are shown for clarity) and a stylii backup electrode 5. A high frequency pulse source 10, as of 55 to 110 kHz. is coupled to stylii backup electrode 5 for providing a bias potential on electrode 5 consisting of a series of narrow, high amplitude pulses, called enhancement pulses. While 55 to 110 kHz. is the typical range of usable repetition rates for the enhancement pulses, any repetition rate such that the interval between enhancement pulses is less than the duration of the pulses applied to the stylii may be used.

A transistor or switching circuit 11 is coupled to each one of stylii 4 to drive stylii 4 to ground upon the selective application of a "write" trigger pulse to the input of transistor 11. The write pulses are relatively wide and low in amplitude and establish an electric field through the charging path which is insufficient to cause avalanche discharge in the airgap. That is, air is a normally nonconductive fluid which when subjected to a critical electric stress will exhibit avalanche discharge. The electric field established by the writing pulses is less than this critical stress.

The principle of operation of the invention lies in the ability of a narrow pulse to quickly charge the conductive and dielectric portions of the paper 1 without ionizing the air as is necessary when recording.

Referring to FIG. 2 there is shown an electrically equivalent model of the paper 1. *Rg* and *Cg* represent the effective resistance and capacitance of the airgap. *Rd* and *Cd* represent the effective resistance and capacitance of the dielectric material 2 and *Rp* and *Cp* represent the effective resistance and capacitance of the conductive material 3.

Since the combined effective capacitance and resistance of the airgap is much less than the combined effective capacitance and resistance of the paper and dielectric, a much higher potential can be developed by an enhancement pulse than by a DC potential of the same amplitude across the airgap within a specified period.

It has been found that so long as the enhancement pulses are maintained below a specified pulse width, as of 2 microseconds, the amplitude of the enhancement pulses may even exceed the minimum DC potential required for recording without effecting avalanche ionization of the airgap, thereby permitting an even greater reduction in the potential swing required of the stylii 4 during recording.

In operation, an enhancement pulse amplitude of 600 volts and a pulse width of 1 microsecond has produced an entirely satisfactory recording of high and low frequency signals over the range of from 0—1.5 kHz. while the stylii potential swing was maintained at approximately 300 volts, a voltage easily within the rating of a variety of low cost, high speed transistors. The coincidence in time of the 600 volt enhancement pulse and the 300 volt writing pulse establish additive electric fields which are sufficient to create avalanche discharge in the gap permitting current to flow through the charging path and charge the recording medium.

The permissible reduction in stylii potential swing thus makes possible the elimination of one of the two stylii driving transistors required heretofore in prior known apparatus. Furthermore, the power supply required to develop the higher voltage is also eliminated. The resulting cost savings are considerable especially in many prior known systems where as many as 100 stylii are used. Of course, even much greater numbers of stylii may be used with proportional cost savings.

Referring again to FIG. 1 stylii 4 are ordinarily placed in line across paper 2 which may be stationary or moved relative to the stylii. For recording of high frequency signals where great resolution is desired, each transistor 11 is rapidly triggered, as of every 2 microseconds, by pulses denominated write-1, write-2, etc. When triggered, each stylii remains in a recording condition for 25 microseconds to insure sufficient charging of the paper 1. As a result, when recording DC or low frequency signals, the same stylii may remain in a recording condition continuously. Under such circumstances, the use of a high DC bias on the backup electrode has the effect of excessively ionizing the air in the airgap and similarly, the paper, with the result that DC and low frequency traces appear blurred and splattered.

The use of the enhancement pulses of the present invention, however, appear to eliminate the excess ionization and result in as clear and as sharp a low frequency and DC recording as is obtained in recording high frequency signals.

Referring to FIG. 3 there is shown an alternative embodiment of the present invention wherein the enhancement pulses are combined with a DC potential to supply the necessary bias on backup electrode 5. Further, there is shown means for recording a grid or chart simultaneously with the recording of the signals together with an associated backup biasing network.

A high frequency oscillator 15, as of 100 kHz., is coupled to a driver 16 and a transistor 17 for providing the enhancement pulses described above with respect to FIG. 1. Driver 16 forms pulses from the oscillator 15 output. The output of transistor 17 is coupled to the primary of a step-up transformer 18. The secondary of transformer 18 is coupled to the backup electrode 5 and the system 300 volt power supply (not shown). The bias developed on backup electrode 5 is therefore the combined potential of the power supply and the potential of the enhancement pulses appearing on the secondary of transformer 18. For a total bias of 600 volts, the enhancement pulses may be maintained at 300 volts. As described with respect to FIG. 1, the pulse width of the enhancement pulses is maintained less than 2 microseconds.

Adjacent the stylii 4 there is provided a chart roll 20 upon which is etched in relief a desired chart. More than one chart roll 20 having various contents or formats may be used if required. Adjacent the backup electrode 5, there are provided one or more chart backup electrodes 21. While chart roll 20 is maintained at ground continuously by well-known means, a DC bias of 300 to 600 volts is applied to backup electrodes 21 via a potentiometer 22. Potentiometer 22 controls the density of the chart trace which can be eliminated entirely if desired by running potentiometer 22 to ground.

For providing as high as 600 volts bias potential on chart roll backup electrodes 21 there is provided a half-wave rectifying and filter circuit 23 consisting of a diode 24 and a capacitor 25. Half-wave rectifying and filter circuit 23 is coupled to the secondary of transformer 18 for developing the additional chart roll backup electrode bias potential required above the available power supply potential by rectifying the enhancement pulses.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In an electrostatic recorder responsive to an input signal means for providing avalanche discharge in a normally nonconductive fluid to form a charge image on a suitable dielectric type recording medium, the combination comprising:

a first and second electrode means proximate one another defining a charging path therebetween formed by the normally nonconductive fluid and at least a portion of the recording medium;

a switching circuit means responsive to the input signal means for generating relatively wide and low amplitude writing pulses which establish a writing electric field through the charging path between the first and second electrode means, the writing electric field being of insufficient strength to cause avalanche discharge in the fluid; and an oscillator means for providing relatively narrow and high amplitude enhancement pulses which establish an enhancement electric field through the charging path in additive relation to the writing electric field, the enhancement field having a strength greater than the DC avalanche stress of the fluid but having a duration insufficient to cause noticeable charging of the recording medium, the additive effect of the write electric field and the enhancement electric field being sufficient to cause avalanche discharge in the fluid causing current to flow between the electrode means and form a charge image on the recording medium, the interval between enhancement pulses being less than the width of the writing pulses.

2. The electrostatic recorder of claim 1 wherein the first electrode means is on one side of the recording medium and the second electrode means is a backup electrode on the opposite side of the recording medium.

3. The electrostatic recorder of claim 2 wherein the writing pulses are of one polarity and are applied to the first electrode means, and the enhancement pulses are of the opposite polarity and are applied to the backup electrode means.

4. The electrostatic recorder of claim 3 wherein the first electrode is a format printing roll.

5. The electrostatic recorder of claim 4 wherein a power supply is provided for establishing a DC bias electric field through the charging path, the sum of the DC bias and the enhancement electric field being greater than the DC avalanche stress of the fluid.

6. The electrostatic recorder of claim 3 wherein the first electrode means is a plurality of writing stylii to which the switching circuit means selectively applies writing pulses.

7. The electrostatic recorder of claim 6 wherein the writing pulses are at least 25 microseconds in width and about 300 v. in amplitude.

8. The electrostatic recorder of claim 3 wherein the enhancement pulses have a duration of less than 2 microseconds.

9. The electrostatic recorder of claim 8 wherein the repetition rate of the enhancement pulses is from about 30 kilohertz to about 110 kilohertz.

10. In an electrostatic recorder responsive to writing pulses for charging a dielectric recording medium, the combination comprising:

a backup electrode;

a plurality of writing stylii mounted proximate to the backup electrode with the recording medium therebetween, the writing stylii responsive to the writing pulses for charging the dielectric recording medium;

a pulse source having a repetition rate of from about 30 kilohertz to about 110 kilohertz coupled to the backup electrode for providing a series of narrow large amplitude pulses for biasing the recording medium, each of the pulses having an amplitude above the minimum DC potential required for recording DC signals on the recording medium;

a chart roll for electrostatically printing on the recording medium;

a chart roll backup electrode spaced apart from the chart roll with the recording medium therebetween;

a DC power supply for providing a bias between the chart roll and the chart roll backup electrode; and circuit means for coupling the DC supply to the chart roll backup electrode, the circuit means comprising means for rectifying and filtering the pulses from the pulse source for providing a DC potential on the chart roll backup electrode higher than the DC potential supplied by the DC power supply.